(12) United States Patent
Brobst

(10) Patent No.: US 7,882,103 B2
(45) Date of Patent: Feb. 1, 2011

(54) USING POINT-IN-TIME VIEWS TO PROVIDE VARYING LEVELS OF DATA FRESHNESS

(75) Inventor: Stephen A. Brobst, Sparks, NV (US)

(73) Assignee: Teradata US, Inc., Dayton, OH (US)

( * ) Notice: Subject to any disclaimer, the term of this patent is extended or adjusted under 35 U.S.C. 154(b) by 2228 days.

(21) Appl. No.: 10/109,025

(22) Filed: Mar. 28, 2002

(65) Prior Publication Data
US 2003/0187862 A1 Oct. 2, 2003

(51) Int. Cl.
*G06F 17/00* (2006.01)
(52) U.S. Cl. ................. 707/717; 707/718; 707/721; 707/730
(58) Field of Classification Search ............ 707/1–3, 707/10, 102, 5, 109.1, 717, 718, 721, 723, 707/730
See application file for complete search history.

(56) References Cited

U.S. PATENT DOCUMENTS

| | | | | |
|---|---|---|---|---|
| 5,471,631 | A * | 11/1995 | Beardsley et al. | 713/502 |
| 6,275,824 | B1 * | 8/2001 | O'Flaherty et al. | 707/9 |
| 6,292,801 | B1 * | 9/2001 | Campbell et al. | 707/10 |
| 6,477,535 | B1 * | 11/2002 | Mirzadeh | 707/101 |
| 6,480,836 | B1 * | 11/2002 | Colby et al. | 707/717 |
| 6,564,121 | B1 * | 5/2003 | Wallace et al. | 700/231 |
| 6,574,636 | B1 * | 6/2003 | Balon et al. | 707/100 |
| 6,631,382 | B1 * | 10/2003 | Kouchi et al. | 707/102 |
| 7,024,681 | B1 * | 4/2006 | Fransman et al. | 725/115 |
| 2005/0066264 | A1 * | 3/2005 | Ohashi et al. | 715/500 |
| 2006/0178905 | A1 * | 8/2006 | Ayers et al. | 705/1 |

* cited by examiner

*Primary Examiner*—Sana Al-Hashemi
(74) *Attorney, Agent, or Firm*—John Cowart Senior Attorney

(57) ABSTRACT

A data-warehousing system allows various areas of an enterprise to view data at varying levels of data freshness. The system acquires data that represents an event in the life of a business enterprise, such as a transaction between the enterprise and one of its customers, and loads this data into a database table. The system then makes the data available for retrieval from the table and stores information indicating when the data was made available for retrieval. In some embodiments, the system also acquires data that is related to and more current than the data representing the event and stores the more current data in the database. The system then stores information indicating when the more current data was stored in the database. Such a data warehouse allows decision-makers in the business to see some information (e.g., customer transaction or account data) up-to-the-moment and other information as it stood at some specific point-in-time, such as at the end of the previous month. The data-warehousing system does this without requiring duplication of data, i.e., without requiring the replication of data in multiple databases or tables. The system allows the enterprise to maintain all of its data in a single database with refresh periods as short as the enterprise wishes. Departments that demand data that changes less frequently can view the data as it stood at some point prior to the last refresh.

12 Claims, 4 Drawing Sheets

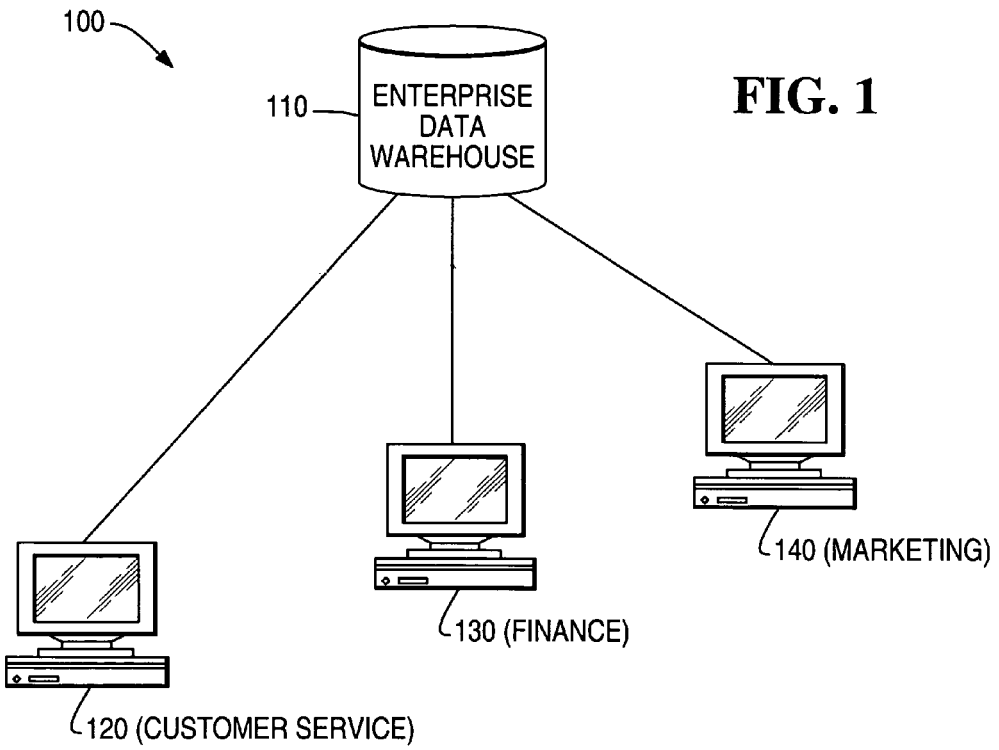

CREATE TABLE CALENDAR
(DAY_DT DATE FORMAT 'YYYY-MM-DD' NOT NULL,
DAY_OF_WEEK_NM CHAR(3) NOT NULL,
FISCAL_WEEK_START_DT DATE FORMAT 'YYYY-MM-DD' NOT NULL,
FISCAL_WEEK_END_DT DATE FORMAT 'YYYY-MM-DD' NOT NULL,
FISCAL_WEEK_NM CHAR(7) NOT NULL,
FISCAL_MONTH_START_DT DATE FORMAT 'YYYY-MM-DD' NOT NULL,
FISCAL_MONTH_END_DT DATE FORMAT 'YYYY-MM-DD' NOT NULL,
FISCAL_MONTH_NM CHAR(3) NOT NULL,
FISCAL_YEAR_START_DT DATE FORMAT 'YYYY-MM-DD' NOT NULL,
FISCAL_YEAR_END_DT DATE FORMAT 'YYYY-MM-DD' NOT NULL,
FISCAL_YEAR_NM CHAR(3) NOT NULL,
. . .
)
UNIQUE PRIMARY INDEX ( DAY_DT )
;

FIG. 3

| EFF_DTS | EE_ID | PLAN | DEP |
|---------|-------|------|-----|
|         |       |      |     |
|         |       |      |     |

340 — EFF_DTS, 310 — EE_ID, 320 — PLAN, 330 — DEP, 300

FIG. 4

| OB_DTS | EFF_DTS | EE_ID | PLAN | DEP |
|--------|---------|-------|------|-----|
|        |         |       |      |     |
|        |         |       |      |     |

420 — OB_DTS, 410 — EFF_DTS, 400

FIG. 6

| OB_START_DTS | OB_END_DTS | EFF_DTS |  |  |
|--------------|------------|---------|--|--|
|              |            |         |  |  |
|              |            |         |  |  |

610 — OB_START_DTS, 620 — OB_END_DTS, 600

USING POINT-IN-TIME VIEWS TO PROVIDE VARYING LEVELS OF DATA FRESHNESS

BACKGROUND

Many business enterprises use data-warehousing systems to store detailed business data for use in making tactical and strategic business decisions. An enterprise-wide data warehouse typically stores a wide variety of information from all areas of the enterprise's business activities, such as customer accounts, items purchased by customers, product sales and inventories at individual retail stores, product distribution, employee-personnel records, and financial records. Such an enterprise-wide data-warehousing system gives decision-makers a single, detailed view of the entire business and allows them to base decisions on information representing the business as it really is, not simply as they suspect it to be.

Because data-warehousing systems often serve many areas of an enterprise's business, the demands for data freshness in the data warehouse often vary. The customer-service department, for example, might require customer-account data that is current to within a few minutes, or even seconds, for use in scoring a customer to influence that customer's interaction with the enterprise. Having an up-to-the-minute view of the customer's interaction with the business enterprise better enables the enterprise's data-analysis tools to produce accurate results, taking into account the most recent interactions with the customer.

The enterprise's finance department, on the other hand, might need data that is updated only once per week or once per month. Departments such as this typically do not require, and in fact are often hampered by, the extreme levels of data freshness needed in other areas of the business enterprise. A department that generates performance analyses covering week-long or month-long periods typically does not want the data for those periods to change while the analyses are under way.

Enterprises have traditionally met demands for varying levels of data freshness by maintaining duplicate copies of data in multiple databases or tables. Some of these databases, such as those that serve customer service departments, are updated very frequently, e.g., every few minutes or seconds. The databases that serve other departments, such as finance departments, are refreshed less frequently, e.g., once per day, once per week, or even once per month, quarter, or year.

SUMMARY

Described below is a data-warehousing system that allows various areas of an enterprise to view data at varying levels of data freshness. Such a data warehouse allows decision-makers in the business to see some information (e.g., customer transaction or account data) up-to-the-moment or as it stood at some specific point-in-time, such as at the end of the previous month. The data-warehousing system does this without requiring duplication of data, i.e., without requiring the replication of data in multiple databases or tables. The system allows the enterprise to maintain all of its data in a single database with refresh periods as short as the enterprise wishes. Departments that demand data that is refreshed less frequently can view the data as it stood at some point prior to the last refresh.

One technique described below involves storing data in such a database system. The system acquires data that represents an event in the life of a business enterprise, such as a transaction between the enterprise and one of its customers, and loads this data into a database table. The system then makes the data available for retrieval from the table and stores information indicating when the data was made available for retrieval. In some embodiments, the system also acquires data that is related to and more current than the data representing the event and stores the more current data in the database. The system then stores information indicating when the more current data was stored in the database.

Another technique involves allowing a user of a database system to view data representing events in the life of a business enterprise. The data is stored in at least one table that includes a first column of information indicating when the events occurred and a second column of information indicating when the data was made available for retrieval from the table. The system receives from the user a request for data representing events that occurred at or before a selected point-in-time and accesses the information stored in the two columns. The system uses this information to select from the table only that data for which the first column indicates that the corresponding event occurred at or before the selected point-in-time and the second column indicates that the data was made available for retrieval before the selected point-in-time. The system then presents the selected data to the user.

Another technique involves retrieving from a database system data that represents events in the life of a business enterprise, where at least some of the data has been updated by more current data. The system receives from a user information identifying a time period and events for which the user wants to view data. The system also constructs a database query that creates a table that stores data associated with that time period and those events. Using the information provided by the user, the system selects from the table the data that the user wants to view, where the selected data includes data for which more current data is available and excludes the more current data. The system then delivers the selected data to the user.

Other features and advantages will become apparent from the description and claims that follow.

BRIEF DESCRIPTION OF THE DRAWINGS

FIG. 1 is a schematic diagram of computer systems in various areas of a business enterprise that all share access to an enterprise data warehouse.

FIG. 3 is a diagram of a database table that stores data representing events in the life of a business enterprise, including a date-time stamp for each table entry.

FIG. 4 is a diagram of a database table that stores event data, including an observation date-time stamp for each table entry.

FIG. 6 is a diagram of a database table that stores event data, including an observation-start date-time stamp and an observation-end date-time stamp for each table entry.

FIG. 7 is an example of a data-definition language (DDL) code segment for use in creating a "calendar table."

DETAILED DESCRIPTION

Figure 2:
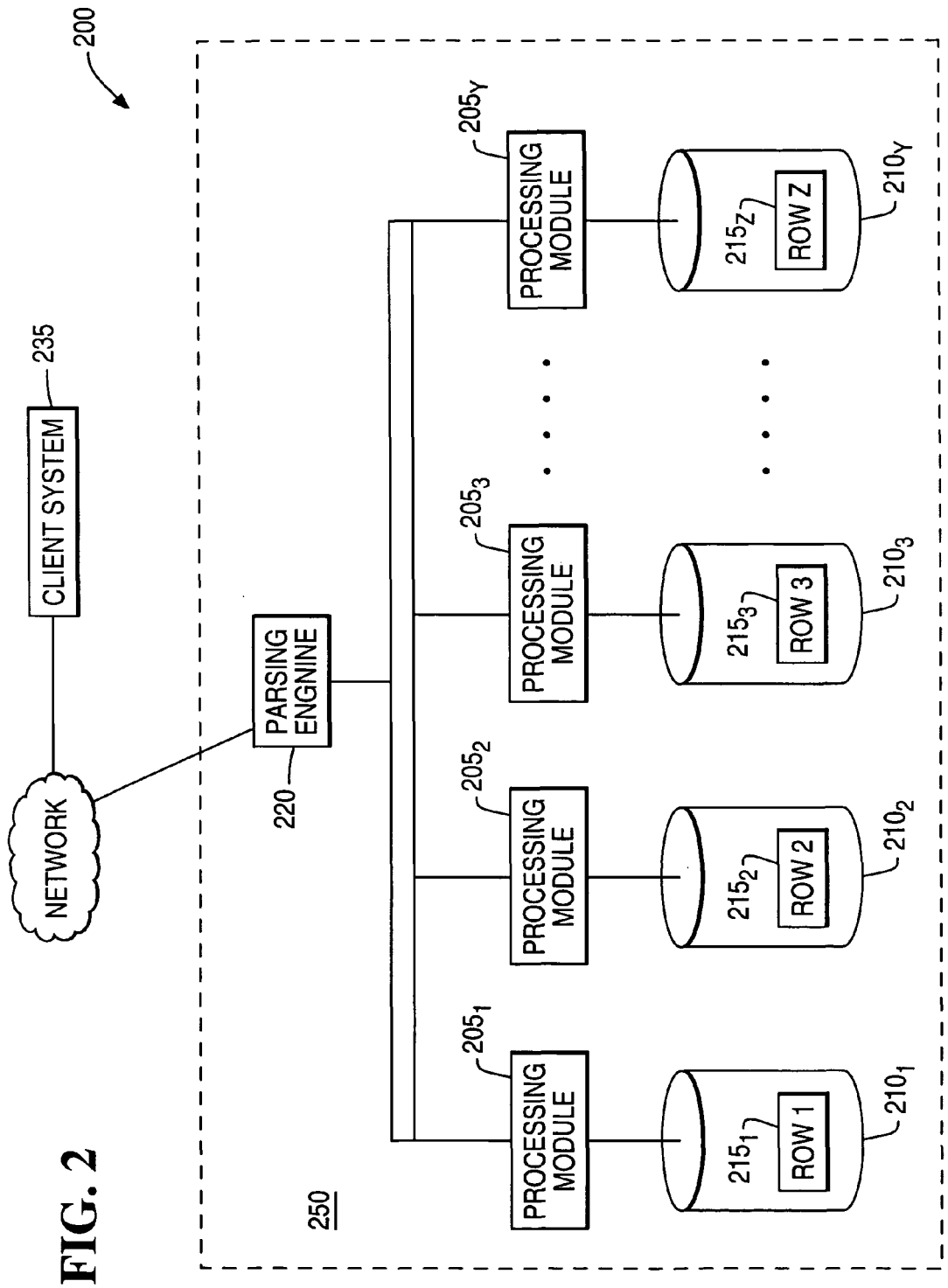
FIG. 2 is a schematic diagram of a massively parallel relational database management system (RDBMS).

FIG. 1 shows a computer network 100 in which an enterprise-wide data-warehousing system 110 supports the activities of the various departments in a business enterprise. The data-warehousing system 110 stores vast amounts of business-critical information, which agents of the enterprise use in making strategic and tactical business decisions. These agents access the information in the data-warehouse through one or more computer systems 120, 130, 140 scattered throughout the various departments of the enterprise. For example, employees in the enterprise's customer service, finance, marketing, and strategic planning departments might all require access to some portion of the data stored in the data warehouse 110.

In many cases, the various departments of the enterprise have different requirements for the freshness of data stored in the data warehouse. For example, the customer-service department might require data that is updated in near-real-time (e.g., every few minutes or seconds) in dealing with customers for whom decisions must be made using up-to-date data. The finance department might require data that is updated only weekly or monthly and that remains consistent (i.e., does not change) during each weekly or monthly period. The data warehouse 105 shown here allows each of these departments to view data at the required level of freshness, and it does so without requiring duplication of data in multiple databases or tables.

FIG. 2 shows one example of a detailed architecture for the data-warehousing system 200. In this example, the data warehouse 200 includes a relational database management system (RDBMS) built upon a massively parallel processing (MPP) platform. Other types of database systems, such as object-relational database management systems (ORDBMS) or those built on symmetric multi-processing (SMP) platforms, are also suited for use here.

As shown here, the data warehouse 200 includes one or more processing modules $205_{1...Y}$ that manage the storage and retrieval of data in data-storage facilities $210_{1...Y}$. Each of the processing modules $205_{1...Y}$ manages a portion of a database that is stored in a corresponding one of the data-storage facilities $210_{1...Y}$. Each of the data-storage facilities $210_{1...Y}$ includes one or more disk drives.

The system stores transaction data and other business-critical data in one or more tables in the data-storage facilities $210_{1...Y}$. The rows $215_{1...Z}$ of the tables are stored across multiple data-storage facilities $210_{1...Y}$ to ensure that the system workload is distributed evenly across the processing modules $205_{1...Y}$. A parsing engine 220 organizes the storage of data and the distribution of table rows $215_{1...Z}$ among the processing modules $205_{1...Y}$. The parsing engine 220 also coordinates the retrieval of data from the data-storage facilities $210_{1...Y}$ in response to queries received from a user at a mainframe 230 or a client computer 235. The data warehouse usually receives queries in a standard format, such as the Structured Query Language (SQL) put forth by the American National Standards Institute (ANSI).

FIG. 3 shows a database table 300 that might appear in a traditional data-warehousing system. Each column of the table 300 stores information about events that occur in the life of a business enterprise. For example, a company that manages an employee health-insurance plan might store information identifying each covered employee (EE_ID, column 310), the type of coverage selected by the employee (PLAN, column 320), and the number of covered dependents claimed by the employee (DEP, column 330). The table also includes a date-time stamp (EFF_DTS, column 340) showing when the employee's coverage began.

Data warehouses that consist of tables like this one are useful in analyzing and understanding business-critical data but are not as well equipped for supporting organizations that have varying requirements for data freshness. Because of the latency inherent in loading data into a data warehouse and, in many cases, delivering data to the enterprise, a database query that selects data according to a traditional effective-date stamp often produces a different result when submitted again at a later time. For example, an employee health plan that covers 200 employees on January 31 might cover an additional person as soon as that person begins work on February 1. Because of the inherent delay in delivering the employee's paper work from the employer to the insurer, the employee might not appear in the insurer's data warehouse until several weeks after the employee's start date. If the insurer were to create a report of covered employees as of February 1 on February 1 and again on February 28 using a traditional data warehouse, the reports would differ—the February 1 report showing 200 employees and the February 28 report showing 201 employees.

FIG. 4 shows a database table 400 that includes, in addition to the traditional column 410 showing the effective-date stamp, another column 420 that shows when the data was loaded into the data warehouse and was made available for viewing, or its observation date-time stamp (OB_DTS). The observation stamp allows the enterprise to see what data was available at any given time or during any given time period, and ensures that a query run at two different times will give the same result each time.

For the example given above, the record for the new employee includes the effective-date stamp showing when the employee's coverage began, as well as an observation stamp showing when the record was added to the database and made available for observation. Viewing data based upon on the observation stamp allows the insurer to generate, if so desired, identical reports on February 1 and again on February 28. The observation stamp allows the insurer to view, quickly and easily, the data that was available to it on February 1, even after the insurer has updated the data to reflect the employee's eligibility as of February 1.

In accessing transaction data—i.e., data which records transactional events that are routine in the life of the business, such as retail purchases by customers, call-detail records, bank deposits and withdrawals, and insurance claims—the data warehouse need only create views of the data it stores for each data-freshness service level, and it need only store the data once. These views filter the data according to the observation stamps that are stored with the data. Below is a selection of sample SQL code that creates a view of transaction data that was current as of 6:00 a.m. on Feb. 20, 2001. In this example, "tx_dts" represents a transaction date-time stamp (i.e., a stamp indicating when a particular transaction took place), and "observation_dts" represents the observation stamp for the corresponding transaction data.

```
create view edw.daily_tx
...
as locking table edw.tx for access
select tx.tx_id
    ,tx.tx_dts
    ,tx.observation_dts
    ,tx.tx_amt
    ...
from edw.tx
where tx.observation_dts <= '2001-02-20 06:00:00'
;
```

Figure 5:
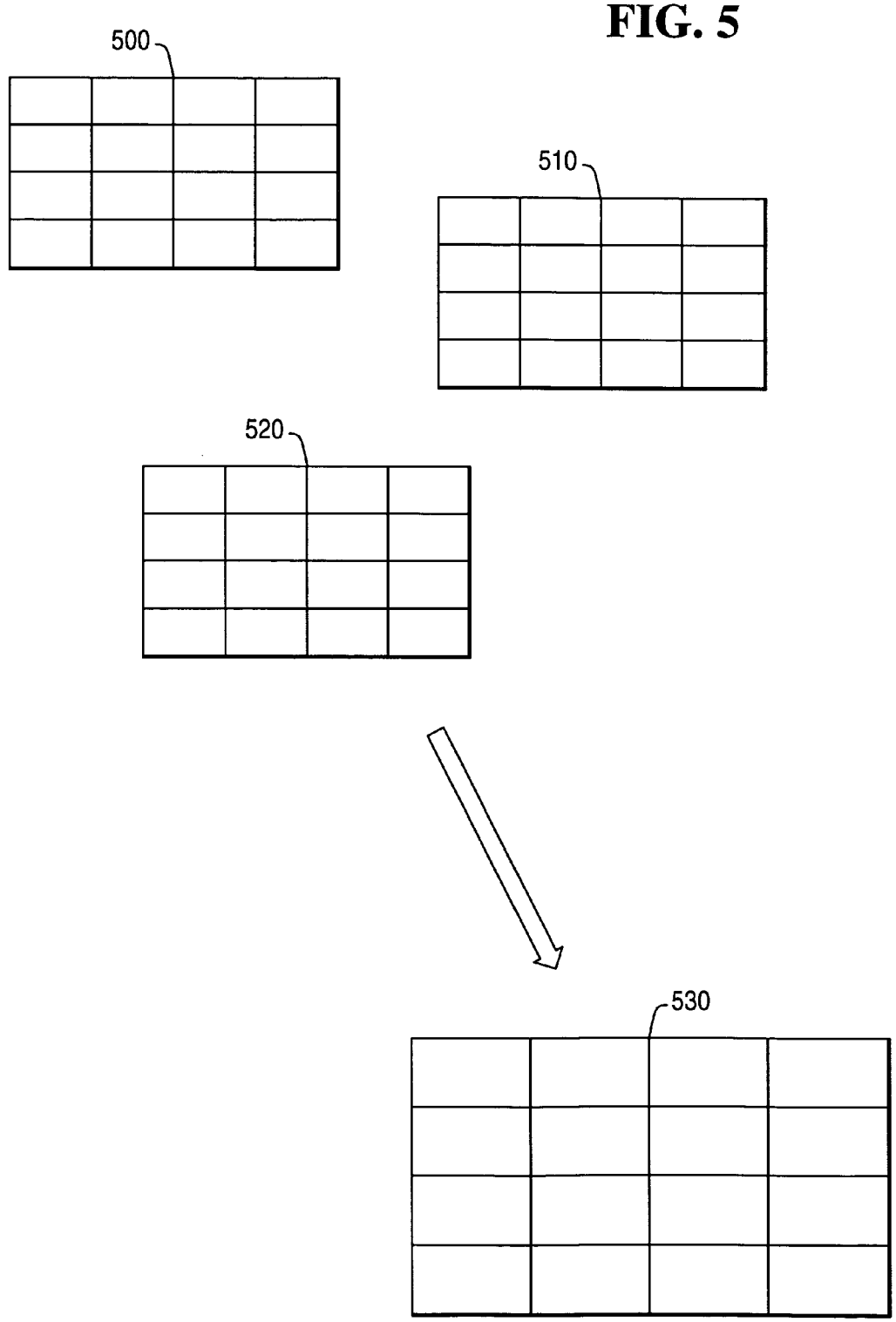
FIG. 5 is a diagram showing a history table that is derived from other database tables.

In accessing snapshot data—i.e., data that records the current or past state of the business or one of its relationships, such as customer status, the status of a customer's account, and the membership or address of a customer household—the data warehouse extracts all relevant data into a history table. As shown in FIG. 5, the database-management system uses observation date-time stamps to select data from various tables 500, 510, 520 throughout the data warehouse and to place that data into a history table 530. The history table 530 creates a point-in-time view of the business as it stood at the selected point-in-time.

One example of a history table for snapshot data is one that captures the average account balance of banking customers on a particular day, such as the first day of every month. Below is a selection of sample SQL code that creates such a table.

```
create table account_history
    (account_id decimal(12, 0) NOT NULL
    ,observation_dt date FORMAT 'YYYY-MM-DD' NOT NULL
    ,account_balance_amt decimal(15, 2) DEFAULT 0.0 NOT NULL
    ,account_status_cd char(1) DEFAULT '0' NOT NULL
    ...
    ) primary index( account_id )
;
```

This technique is particularly useful for taking historical snapshots of data that an enterprise wishes to view with fixed periodicity. The account balance of a banking customer at the end of the customer's statement period is one example of the type of data that a business commonly wishes to view with fixed periodicity.

The typical business enterprise also often wishes to view snapshot data on an ad-hoc basis, with no regularity or periodicity in its viewing patterns. For example, businesses often view data when some event occurs that changes the view of that data, such as the acquisition of new data or the modification of old data, realignment or reorganization of the enterprise, and changes in a customer's status or life situation.

FIG. 6 shows such a table 600. The first of the observation stamps, the "observation-start stamp" (OB_START_DTS) (column 610), indicates when the corresponding data has been loaded into the data warehouse and made available for viewing. The second of these stamps, the "observation-end stamp" (OB_END_DTS) (column 620), indicates when the row of data has become stale as a result of some event, such as an update to the database records or the expiration of a time period for which the data is accurate. For the most current observation of any particular row of data, the value of the observation-end stamp is set to "NULL," or, alternatively, is set to a very distant future date. Below is a selection of sample SQL code for use in querying a history table to calculate the average income of customers as of the date Jan. 1, 2001.

```
select avg(customer_history.income_amt)
from edw.customer_history
where customer_history.account_status_cd = 'A'
    and customer_history.observation_dt =
        (select max(i_customer_history.observation_dt)
        from edw.customer_history i_customer_history
        where i_customer_history.observation_dt <= '2000-01-01'
            and i_customer_history.customer_id =
customer_history.customer_id)
;
```

This example shows a code segment for use with a table that stores a single observation stamp. This code is relatively complex and is somewhat inefficient, because it includes a correlated sub-query to select all of the desired point-in-time data for the period of interest. Storing one or more additional observation date-time stamps, as described above, eliminates any need for a correlated sub-query and thus allows for more efficient queries with much simpler code. Below is a selection of sample SQL code for the same query as above, run against a table that stores two observation date-time stamps—an observation-start DTS and an observation-end DTS.

```
select avg(customer_history.income_amt)
from edw.customer_history
where customer_history.account_status_cd = 'A'
    and customer_history.observation_start_dt <= '2000-01-01'
    and (customer_history.observation_end_dt > '2000-01-01'
        or
        customer_history.observation_end_dt is NULL)
;
```

Storing observation date-time stamps in the tables of an enterprise data warehouse allows the enterprise to view data as of any point-in-time needed for decision-making purposes, and it does so without requiring duplication of data. Point-in-time views that an enterprise often needs are:

(1) "As is" view—Allows the enterprise to view the most current ("freshest") data in the data-warehousing system.

(2) "As-was" view—Allows the enterprise to view the data as it stood at a selected point-in-time before the most recent update. For the example given above, an "as-was" view allows the insurer to view a report on February 28 that shows only the 200 employees who, according to the insurer's data as it stood on February 1, were covered on February 1.

(3) "Mixed point-in-time" view—Allows the enterprise to combine data stored at different points-in-time according to query specifications. For the example given above, a "mixed point-in-time" view allows the insurer to see a list of the 200 employees who appeared in its records on February 1 listed according to their names as they appear in the most current data. This allows the insurer to see employee records as they stood on February 1 while taking into account any name changes that might have occurred since then.

FIG. 7 shows a sample code fragment that a database administrator might choose to run when setting up a database system. This code fragment creates a table, known here as a "calendar table," that simplifies end-user access to point-in-time information in the database. Creating a calendar table and defining views to that table insulates the end-user from the database-query code needed to extract point-in-time information from the database.

Such a table is useful, for example, when the end-user wants to access information for a time period of selected length (i.e., one week or one month) on an ad-hoc basis. (e.g., with no particular regularity, beginning with a date or time chosen by the user). The user simply enters the point-in-time for which data is needed, and the database retrieves the appropriate data using the calendar table. The data pulled in response to the user's query remains consistent over time, so that the same query run at a later date produces the same result.

The user enters the point-in-time query through a simple user-interface program, such as a Windows-compatible graphical user-interface (GUI) program, running in the client system, the likes of which are well-known and are not described here. Below are sample database queries, shown in SQL code, for use in creating views to the data in the calendar table. The first query provides data for a period of one week; the second query provides data for a period of one month.

```
create view edw.weekly_customer_history
(...)
as locking table edw.customer_history for access
    locking table edw.calendar for access
select customer_history.customer_id
        ,calendar.day_dt
        ...
        ,customer_history.birth_dt
        ,customer_history.income_amt
        ,customer_history.customer_status_cd
        ...
from edw.customer_history
        edw. calendar
where customer_history.observation_start_dt <=
calendar.fiscal_week_start_dt
    and (customer_history.observation_end_dt >
calendar.fiscal_week_start_dt
        or
        customer_history.observatlon_end_dt is NULL)
;
create view edw.monthly_customer_history
(...)
as locking table edw.customer_history for access
    locking table edw.calendar for access
select customer_history.customer_id
        ,calendar.day_dt
        ...
        ,customer_history.birth_dt
        ,customer_history.income_amt
        ,customer_history.customer_status_cd
        ...
from edw.customer_history
        edw. calendar
where customer_history.observation_start_dt <=
calendar.fiscal_month_start_dt
    and (customer_history.observation_end_dt >
calendar.fiscal_month_start_dt
        or
        customer_history.observatlon_end_dt is NULL)
;
```

Computer-Based and Other Implementations

The techniques described here are typically implemented in electronic hardware, computer software, or combinations of these technologies. Most implementations include one or more computer programs executed by one or more programmable computers in a data warehousing system. In general, each computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. For example, while much of the description above explains a health insurer's use of observation information in eligibility records, the techniques described here apply to other industries and business areas as well, including those in which transactions with customers are more prevalent, such the banking, retail and communications industries. Many other embodiments are also within the scope of the following claims.

I claim:

1. A method for use in allowing the user of a database to view data representing events in the life of a business enterprise, where the data is stored in one or more database tables that include a first set of records indicating when the events occurred and a second set of records indicating when the data was made available for retrieval from the database, the method comprising:

receiving a request for data representing one or more events that occurred at or before a selected point-in-time, where the request occurs at some point after the selected point-in-time has passed;

accessing the information stored in the first and second sets of records to identify when the events occurred and when data corresponding to the events was made available for retrieval;

selecting from the table data for which:
 (a) the first set of records indicates that a corresponding one of the events occurred at or before the selected point-in-time; and
 (b) the second set of records indicates that the data was made available for retrieval at or before the selected point-in-time; and delivering the selected data to for presentation to the user.

2. A database system comprising:

a database that includes one or more tables of data stored on one or more storage facilities and managed by one or more processing units, where the one or more tables include:

entries that store data representing one or more events in the life of a business enterprise;

a first set of records that stores information indicating when the events occurred; and a second set of records that stores information indicating when the data was loaded into the database; and a data-management component configured to:

receive a request for data representing one or more of the events that occurred at or before a selected point-in-time, where the request occurs at some point after the selected point-in-time has passed;

access the information stored in the first and second sets of records to identify when the events occurred and when data corresponding to the events was loaded into the table;

select from the table data for which:
 (a) the first set of records indicates that a corresponding one of the events occurred at or before the selected point-in-time; and
 (b) the second set of records indicates that the data was loaded into the database at or before the selected point-in-time; and deliver the selected data for presentation to the user.

3. A computer program, stored on a tangible storage medium, for use in allowing the user of a database to view data representing events in the life of a business enterprise, where the data is stored in one or more database tables that include a first set of records indicating when the events occurred and a second set of records indicating when the data was made available for retrieval from the database, the program comprising executable instructions that cause a computer to:

receive a request for data representing one or more events that occurred at or before a selected point-in-time, where the request occurs at some point after the selected point-in-time has passed;

access the information stored in the first and second sets of records to identify when the events occurred and when data corresponding to the events was made available for retrieval;

select from the table data for which:
 (a) the first set of records indicates that a corresponding one of the events occurred at or before the selected point-in-time; and
 (b) the second set of records indicates that the data was made available for retrieval at or before the selected point-in-time; and deliver the selected data for presentation to the user.

4. The method of claim 1, where the step of delivering the selected data for presentation to the user includes creating a database view through which the data is displayed.

5. The method of claim 1, where the step of delivering the selected data for presentation to the user includes creating another database table and extracting the selected data into that table.

6. The method of claim 1, where receiving a request from the user includes receiving input that does not include database-query code.

7. The system of claim 2, where the database also stores newer data that is related to and more current than the data representing one or more of the events, and where the one or more tables include a third set of records indicating when the newer data was stored in the database.

8. The program of claim 3, where, in delivering the selected data for presentation to the user, the computer creates a database view through which the data is displayed.

9. The program of claim 3, where, in delivering the selected data for presentation to the user, the computer creates another database table and extracts the selected data into that table.

10. The program of claim 3, where, in receiving a request from the user, the computer receives input that does not include database-query code.

11. The program of claim 10, where, in receiving input from the user, the computer receives only information that identifies the selected point-in-time.

12. The method of claim 6, where receiving input from the user includes receiving only information that identifies the selected point-in-time.

* * * * *